United States Patent [19]
Van Helmond et al.

[11] Patent Number: 5,973,048
[45] Date of Patent: Oct. 26, 1999

[54] MELT AND COLOR STABILIZATION OF ALIPHATIC POLYKETONES

[75] Inventors: Johannes Van Helmond, Bergen op Zoom; Gerrit de Wit, Ossendrecht, both of Netherlands

[73] Assignee: General Electric Company, Pittsfield, Mass.

[21] Appl. No.: 08/909,008

[22] Filed: Aug. 8, 1997

[51] Int. Cl.$^6$ .............................. C08K 3/10; C08K 5/053
[52] U.S. Cl. .......................... 524/394; 524/397; 524/399
[58] Field of Search .................................... 524/394, 397, 524/399, 345

[56] References Cited

U.S. PATENT DOCUMENTS

| | | |
|---|---|---|
| 2,495,286 | 6/1950 | Brubaker . |
| 3,694,412 | 9/1972 | Nozaki . |
| 4,299,751 | 11/1981 | Thornwald et al. . |
| 4,843,144 | 6/1989 | Broekhoven et al. . |
| 4,880,903 | 11/1989 | Van Broekhoven et al. . |
| 5,122,565 | 6/1992 | George . |
| 5,427,943 | 6/1995 | Suoranto . |
| 5,527,851 | 6/1996 | Barron et al. . |

FOREIGN PATENT DOCUMENTS

| | | |
|---|---|---|
| 629 663 A1 | 12/1994 | European Pat. Off. . |
| 1081 304 | 3/1965 | United Kingdom . |

OTHER PUBLICATIONS

Tsukamoto, CAPLUS AN 1996: 443729, abstracting JP 08/00093, Apr. 1996.

*Primary Examiner*—Jeffrey C. Mullis

[57] ABSTRACT

An aliphatic ketone polymer composition having during melt processing improved melt stabilization against significant cross linking and reduced discoloration wherein the composition has in addition to the aliphatic ketone polymer an additive stabilizer comprising a polyol such as sorbitol and an aluminum hydroxide, or an alumina hydrogel, or decomposition products thereof such as pseudo-boehmite. The additive is present in an amount of about 0.01 to about 10.0 weight % based on the weight of ketone polymer and additive.

14 Claims, No Drawings

MELT AND COLOR STABILIZATION OF ALIPHATIC POLYKETONES

FIELD OF THE INVENTION

This invention relates to polyketones and, more particularly, to compositions of polyketones stabilized with a mixture of an aluminum compound and a polyol such as sorbitol.

BACKGROUND OF THE INVENTION

The class of polymers of carbon monoxide and olefins has been known for some time. U.S. Pat. No. 2,495,286 (Brubaker) discloses such polymers of relatively low carbon monoxide content in the presence of free radical initiators, e.g., peroxy compounds. G.B. 1,081,304 discloses similar polymers of higher carbon monoxide content in the presence of alkylphosphine complexes of palladium compounds as catalyst. U.S. Pat. No. 3,694,412 (Nozaki) extended the reaction to produce linear alternating polymers in the presence of arylphosphine complexes of palladium moieties and certain inert solvents.

More recently, the class of linear alternating polymers of carbon monoxide and at least one ethylenically unsaturated hydrocarbon, now known as polyketones or ketone polymers, has become of greater interest. U.S. Pat. No. 4,880,903 (VanBroekhoven, et al.) discloses a linear alternating ketone terpolymer of carbon monoxide, ethylene, and other olefinically unsaturated hydrocarbons, such as propylene. Processes for production of the polyketones typically involve the use of a catalyst composition formed from a compound of a Group VIII metal selected from palladium, cobalt or nickel, the anion of a strong non-hydrohalogenic acid and a bidentate ligand of phosphorus, arsenic or antimony. U.S. Pat. No. 4,843,144 (VanBroekhoven, et al.) discloses a process for preparing polymers of carbon monoxide and at least one ethylenically unsaturated hydrocarbon using the preferred catalyst comprising a compound of palladium, the anion of a non-hydrohalogenic acid having a pKa of below about 6 and a bidentate ligand of phosphorus. U.S. Pat. No. 4,880,903 and U.S. Pat. No. 4,843,144 are hereby incorporated by reference.

The resulting polymers are relatively high molecular weight materials having established utility as premium thermoplastics in the production of shaped articles, such as containers for food and drink and parts for the automotive industry, which are produced by processing the polyketone according to well known methods.

However, such polymers are susceptible to cross-linking reactions during melt processing such as extrusion and injection molding. Considerable research and development has been expended to improve the melt stability of polyketones. One such stabilizer is disclosed in European patent EP 629663 in which pseudo-boehmite [ALO(OH)] is disclosed to improve melt stabilization and which is incorporated herein by reference. The addition of up to 1 weight % of pseudo-boehmite substantially reduces cross linking during melt processing. Unfortunately, compounds based on polyketones and pseudo-boehmite show some discoloration during melt processing.

SUMMARY OF THE INVENTION

The present invention provides certain stabilized polymeric compositions of alternating or random type polymers comprising carbon monoxide and at least one ethylenically unsaturated hydrocarbon, and a process for the production of such stabilized compositions. The certain polymers of this invention are known as polyketones. The polyketone compositions are stabilized with a mixture of a polyol and an alumina hydrogel, or an aluminum hydroxide in its various forms and optionally with other aluminum oxygen compounds, or decomposition products thereof. As used herein and in the claims, aluminum hydroxide shall mean alumina hydrogel, an aluminum hydroxide in its various forms and optionally with other aluminum oxygen compounds or decomposition products thereof. The aluminum hydroxide may be of the formula $Al_2O_3 \cdot nH_2O$, where n is 0 to 10. More particularly, the invention provides compositions comprising the alternating or random type ketone polymers having a stabilizing amount of a mixture of a polyol and an aluminum hydroxide compound such as boehmite or pseudo-boehmite. The resulting compositions of polyketone and stabilizer demonstrate improved stability upon being subjected to melt processing conditions and have greatly reduced discoloration during melt processing. The ketone polymers may also be linear alternating or linear random type polymers.

DESCRIPTION OF THE INVENTION

The stabilized ketone polymers of this invention are of an alternating or random type structure, preferably an alternating structure which would contain substantially one molecule of carbon monoxide for each molecule of unsaturated hydrocarbon. Suitable ethylenically unsaturated hydrocarbons for use as precursors of the ketone polymers have up to 20 carbon atoms inclusive, preferably up to 10 carbon atoms, and are aliphatic such as ethylene and other α-olefins including propylene, 1-butene, isobutylene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethykstyrene and m-isopropylstyrene. The preferred ketone polymers are copolymers of carbon monoxide and ethlene or terpolymers of carbon monoxide, ethylene and a second ethylenically unsaturated hydrocarbon of at least 3 carbon atoms, particularly an α-olefin such as propylene.

When the preferred ketone terpolymers are employed as the major polymeric component of the blends of this invention, there will be within the terpolymer at least 2 units and preferably about 10 to about 100 units incorporating a moiety of ethylene for each unit incorporating a moiety of the second hydrocarbon. The polymer chain of the preferred ketone polymers is therefore represented by the repeating formula

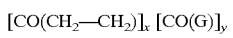

wherein G is the moiety of ethylenically unsaturated hydrocarbon of at least 3 carbon atoms polymerized through the ethylenic unsaturation and the ratio of y:x is no more than about 0.5. When copolymers of carbon monoxide and ethylene are employed in the blends of the invention, there will be no second hydrocarbon present and the copolymers are represented by the above formula wherein y is zero. When y is other than zero, i.e., terpolymers are employed, the —CO(CH₂—CH₂) units and the —CO(G) units are found randomly throughout the polymer chain, the preferred ratios of y:x are from about 0.01 to about 0.1. The end groups or "caps" of the polymer chain will depend upon what materials were present during the production of the polymer and whether or how the polymer was purified. The precise nature of the end groups does not appear to influence the properties of the polymer to any considerable extent so that the polymers are fairly represented by the formula for the polymer chain as depicted above.

Of particular interest are the ketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer and, in the case of the terpolymers, the nature and the proportion of the second hydrocarbon present. Typical melting points for the polymers are from about 175° C. to about 300° C., more typically from about 210° C. to about 260° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

A preferred method for the production of the polyketones is illustrated by U.S. Pat. No. 4,843,144 (Van Broekhoven, et al.) which has been incorporated herein by reference. The carbon monoxide and hydrocarbons monomer(s) are contacted under polymerization conditions in the presence of a catalyst composition formed from a compound of palladium, the anion of a non-hydrohalogenic acid having a pKa (measured in water at 18° C.) of below about 6, preferably below 2, and a bidentate ligand of phosphorus. The scope of the polymerization is extensive but, without wishing to be limited, a preferred palladium compound is a palladium carboxylate, particularly palladium acetate, a preferred anion is the anion of trifluoroacetic acid or p-toluenesulfonic acid and a preferred bidentate ligand of phosphorus is 1,3-bis(diphenylphosphino)propane or 1,3-bis[-di(2-methoxyphenyl) phosphino]propane.

The polymerization to produce the ketone polymers is conducted in an inert reaction diluent, preferably an alkanolic diluent, and methanol is preferred. The reactants, catalyst composition and reaction diluent are contacted by conventional methods such as shaking, stirring or refluxing in a suitable reaction vessel. Typical polymerization conditions include a reaction temperature from about 20° C. to about 150° C., preferably from about 50° C. to about 135° C. The reaction pressure is suitably from about 1 atmosphere to about 200 atmospheres but pressures from about 10 atmospheres to about 100 atmospheres are preferred. Subsequent to polymerization, the reaction is terminated as by cooling the reactor and contents and releasing the pressure. The polyketone is typically obtained as a product substantially insoluble in the reaction diluent and the product is recovered by conventional methods such as filtration or decantation. The polyketone is used as recovered or is purified as by contact with a solvent or extraction agent which is selective for catalyst residues. Also U.S. Pat. Nos. 5,527,851; 5,187,258 and 4,925,918 disclose polyketones and processes for preparing polyketones and are hereby incorporated herein by reference.

The stabilized compositions of the invention comprise an intimate mixture of the ketone polymer with a stabilizing amount of a stabilizer which is a mixture of a polyol and an aluminum hydroxide.

The polyol employed in the practice of this invention may be generally any polyol. Preferably such polyols include without limitation, propylene glycol, glycerol, mono- or oligosaccharides or sugar alcohols such as xylose, mannitol and sorbitol, mono- or oligo- or polymeric carbohydrates such as partially hydrolysed starch, cellulose, agarose, polyethylene glycol, and polyols with at least 2 hydroxyl groups and having a carbon content of at least 4 carbon atoms and preferably 4–20 carbon atoms. Another preferred polyol is a reduced carbohydrate and the more preferred polyol is sorbitol having the formula:

It has been surprisingly found that the addition of a polyol with an aluminum hydroxide to the polyketone reduces cross-linking of the polyketone during melt processing and discoloration.

The other component of the stabilizer mixture of the invention is an aluminum hydroxide. The precise form of the aluminum species of this invention present in the final composition will depend upon a number of factors including the degree of moisture in the polymer with which an aluminum hydroxide is mixed, whether or not the composition has been exposed to moisture (as by contact with a humid environment) and the temperature at which the composition is exposed and the number of times the composition has been thermally processed. It is known, for example, that the alumina hydrogel will lose moisture and form crystalline phases upon aging, such that the hydrogel is transformed, probably to species containing a mixture of aluminum hydrogel and aluminum oxide moieties. At elevated temperatures, thermal decomposition of the alumina hydrogel may occur, and is also considered to give species containing aluminum hydroxyl and oxide moieties.

The aluminum hydroxide employed in this invention can be represented by the formula $Al_2O_3 \cdot nH_2O$ where n is 0 to 10. These hydroxides can be prepared by titrating an aqueous solution of one or more aluminum salt(s) with an appropriate acidic or basic material or solution to cause precipitation of the aluminum gel. U.S. Pat. Nos. 3,124,418; 3,520,654; and 4,154,812 disclose processes for preparing pure aluminum hydroxide. U.S. Pat. No. 4,851,470 discloses mineral-filled ketone polymers, and includes aluminum trihydrate as a suitable filler.

The aluminum hydroxide can be prepared by titrating an acidic aluminum salt such as, aluminum sulfate, aluminum nitrate, or aluminum chloride, in aqueous solution with a basic precipitating medium, such as sodium hydroxide or ammonium hydroxide, or by titrating an alkali metal aluminate, for example, sodium aluminate or potassium aluminate, in aqueous solution with an acidic precipitating medium, for example, hydrochloric or nitric acid. Adjustment of the pH of an aluminum-containing solution to between about 5.5 to about 10.0 will result in precipitation of the aluminum as aluminum hydroxide and hydrated aluminum oxide.

The aluminum hydroxide usable within the scope of the present invention include aluminum trihydroxides, such as gibbsite or hydrargillite ($\alpha$-alumina trihydrate, $\alpha$-$Al(OH)_3$ or $\alpha$-$AL_2O_3 \cdot 3 H_2O$), bayerite ($\beta$-alumina trihydrate, $\beta$-$AL(OH)_3$ or $\beta$-$Al_2O_3 \cdot 3 H_2O$) and nordstrandite (new $\beta$-$Al(OH)_3$). Also included within the class of aluminum hydroxide or decomposition products thereof are the aluminum oxide hydroxides, including boehmite and pseudo-boehmite $\alpha$-aluminum monohydrate, $AlO(OH)$ or $\alpha$-$Al_2O_3 \cdot H_2O$) and diaspore ($\beta$-aluminum monohydrate, $AlO(OH)$ or $\beta$-$Al_2O_3 \cdot H_2O$). Corundum, ($\alpha$-aluminum, $Al_2O_3$) is also contemplated within the scope of the phrase aluminum hydrogel, an aluminum hydroxide or decomposition products thereof. Bayerite, gibbsite, boehmite, and/or mixtures thereof are preferred hydroxides for use herein, and boehmite and pseudoboehmite are particularly preferred.

The amount of polyol employed in the stabilizer mixture in the practice of this invention can range from about 10 weight % to about 70 weight % of the mixture of the polyol and aluminum hydroxide and preferably about 40 to about 60 weight % of the polyol and correspondingly 90 to about 30 weight % of aluminum hydroxide and preferably about 60 to 40 weight % of the aluminum hydroxide.

The mixture of polyol and aluminum hydroxide is employed in a stabilizing quantity. The specific amount of stabilizing mixture present in the compositions of the invention is not critical, as long as a stabilizing quantity is present, and other important polymer properties for the intended use are not adversely affected. The precise amount required for melt stabilization and reduced discoloration will depend upon a variety of factors, such as the melt temperature, the polymer's LVN, and the interactive effects of other additives. The mixture of polyol and an aluminum hydroxide is provided in an amount of from about 0.01 wt % to about 10 wt %, based on the weight of the polymer to be stabilized. Compositions containing from about 0.05 wt % to about 2 wt % of the mixture on the same weight basis are preferred.

The stabilizer of this invention is added to the polyketone by any method suitable for forming an imtimate admixture of the polymer and stabilizers. Such methods include dry blending of the polymer and stabilizers in a finely divided form, followed by hot pressing or extrusion of the mixture. The composition may also be produced by blending the components in a melt mixing device such as an extruder. The stabilizer components are preferably added to the polymer at the same time, but satisfactory results are obtained when the components are added separately. However, if the components of the stabilizer mixture are added separately it is preferred that the polyol be added first followed by the aluminum hydroxide.

The compositions of the invention may also include other additives such an antioxidants, dyes, fillers or reinforcing agents, fire resistant materials, mold release agents, colorants, polymers, impact modifiers, other stabilizers, and other materials designed to improve the processability of the polymers or the properties of the resulting blend. Specific other additives that can be added to the composition include, but are not limited hereto, aluminum trioxide, aluminum hydroxylates, zinc aluminate, hydroxy apatite, zinc aluminate, cupric chromite, mercapto-benzimidozole, aromatic amines (one or two ring amines), aluminum phenoxide, tri-acetyl acetonate, aluminum stearate, zinc-oxide, zinc sulfide, trialkylphosphite, carbon dioxide, zinc salt of an acidic polymer, hydroxy apatite, carbonated hydroxy apatite, mixture of hydroxy apatite and zinc aluminate, mixture of hydroxy apatite and aluminum hydroxide, mixture of magnesium oxide and titanium dioxide, tri-alkoxide compounds with hydroxy apatite, phenolic compounds, decyl alcohol, and 2-ethyl-1-hexanol. Such additives are added prior to, together with, or subsequent to the blending of the polyketone and stabilizers. The presence of these additives may affect the optimum level of stabilizer additive of this invention for a given application.

The compositions are processed by methods such as extrusion and injection molding into sheets, films, plates and shaped parts including blow molding, vacuum forming, compression molding and the like. The compositions of the invention are particularly useful for the production of articles by multiple melting/crystalline cycles, and where elevated temperatures are likely to be encountered. Illustrative of such applications are the production of articles useful in both rigid and flexible packaging applications, such as containers and films, and in both internal and external parts for automotive use; fibers useful yarns, tire cord, and fabric; and coatings for a variety of materials.

DETAILED DESCRIPTION OF THE EXAMPLES OF THIS INVENTION

This invention can be further described by means of the following examples; it being understood, however, that this invention shall in no way be restricted by these examples. In the examples where amounts are in terms of percent, they are percent by weight unless otherwise stated.

The test procedures employed for determining color stability were as follows:

| | |
|---|---|
| Yellowness Index (YI) | determined in accordance with ASTM-E-313 |
| MVR | Melt Volume Rate in accordance with ISO-1133 |
| Polyketone | a ketone terpolymer prepared from carbon monoxide, ethylene and propylene under standard conditions and having a melting point of about 220° C. |
| $T_c$ | Crystallization temperature |
| $H_c$ | enthalpy of crystallization. $T_c$ and $H_c$ are determined by differential scanning calorimeter (DSC). With heating and cooling rates of 20° C./minute, the sample is heated from 40° C. to 240° C., cooled (1$^{st}$ cooling scan) to 40° C., heated to 260° C., kept at that temperature for 15 minutes and cooled (2$^{nd}$ cooling scan) to 40° C. The temperature at maximum crystallization rate and the total enthalpy of crystallization during the 1$^{st}$ ($T_c1$) respectively $H_c1$ and the 2nd ($T_c2$) respectively $H_c2$) cooling scan are recorded. This provides: $\Delta T_c = T_c1 - T_c2(°C.)$ $H_c loss = \dfrac{H_c1 - H_c2}{H_c1} \times 100(\%)$ |

EXAMPLE 1

Formulations of polyketone was prepared as set forth in TABLE 1 below to prepare Formulations A, B, C and D. Each formulation was compounded in a 16 mm double-screw extruder, adjusted at a temperature range of 190° C. up to 220° C., extruded into strands cooled and the extrudate was pelletized. The pellets were dried at about 120° C. for about 2 hours and subjected to MVR and DSC measurements. The pellets for each formulation were injection molded into sample plaques employing a 35 ton injection molding machine at a temperature of about 225° to 230° C. The plaques were then tested for color stability by determining Yellowness Index (YI). The results obtained are shown in TABLE 1 below.

TABLE 1

| | Formulation | | | |
|---|---|---|---|---|
| Composition | A | B | C | D |
| Polyketone | 99.9% | 98.9% | 98.9% | 97.9% |
| Antioxidant* | 0.1 | 0.1 | 0.1 | 0.1 |
| Pseudo-boehmite | | 1.0 | | 1.0 |
| Sorbitol | | | 1.0 | 1.0 |

TABLE 1-continued

| Composition | Formulation | | | |
|---|---|---|---|---|
| | A | B | C | D |
| Properties | | | | |
| MVR @ 240° C./5 kg | | | | |
| at 4 mins (ml/10 min) | 15.0 | 26.1 | 18.2 | 29.2 |
| at 8 mins. (ml/10 min) | 3.8 | 22.2 | 7.5 | 25.7 |
| at 12 mins. (ml/10 mins) | 0.0 | 19.6 | 0.9 | 21.6 |
| Yl | 16 | 57 | 17 | 34 |
| $\Delta T_c °$ C. | 24 | 6 | 22 | 11 |
| $H_c$ loss % | 14 | 7 | 29 | 0 |

*The same antioxidant was used in each formulation which was a pentaerythritol propionate based antioxidant.

The results were the average of five (5) samples. Overall, Formulation D, the composition of this invention, had better overall properties than Formulations A, B and C. Formulations A and C without the pseudo-boehmite had a high degree of crosslinking as shown by the loss of flow (MVR), the strong shift of crystallization temperature ($\Delta$ Tc) and the high loss of crystallinity ($H_c$). Addition of only pseudoboehmite (Formulation B) provides significant improvement in stability, but produces a brownish color which is unacceptable. However, the addition of both pseudoboehmite and sorbitol (formulation D) provides both good melt stability and an acceptable color.

EXAMPLE 2

Example 1 was repeated except that the Formulations employed herein were as set forth on TABLE 2 below with the results, Formulation E was the reference or benchmark Formulation:

TABLE 2

| Composition | E | F | G | H | I | J | K | L |
|---|---|---|---|---|---|---|---|---|
| Polyketone | 98.9% | 97.9% | 97.9% | 97.9% | 97.9% | 97.9% | 97.9% | 97.9% |
| Antioxidant | 0.1 | 0.1 | 0.1 | 0.1 | 0.1 | 0.1 | 0.1 | 0.1 |
| Pseudoboehmite | 1 | 1 | 1 | 1 | 1 | 1 | 1 | 1 |
| Sorbitol | | 1 | | | | | | |
| Xylitol | | | 1 | | | | | |
| Adonitol | | | | 1 | | | | |
| Mannitol | | | | | 1 | | | |
| Dulcitol | | | | | | 1 | | |
| Glycerol | | | | | | | 1 | |
| Pentaerythritol | | | | | | | | 1 |
| $\Delta T_c$ ° C. | 7 | 7 | 7 | 10 | 9 | 9 | 11 | 11 |
| $H_c$-loss % | 7 | 6 | 9 | 13 | 10 | 8 | 13 | 17 |
| Yellowness Index | 58 | 11 | 1i | 19 | 14 | 14 | 18 | 18 |

While variations of this invention will be suggested to those skilled in the art, in view of the above disclosures, to be within the scope of the claims appended hereto.

What is claimed is:

1. An aliphatic ketone polymer composition having improved melt stabilization and reduced discoloration during melt processing comprising an aliphatic ketone polymer of carbon monoxide and at least one ethylenically unsaturated hydrocarbon and an additive stabilizer comprising a carbon containing polyol and an aluminum hydroxide compound in which the polyol is present at a level of at least about 10 weight percent based on the polyol and aluminum hydroxide compound, said additive being present in an amount sufficient to provide an improved melt stabilized ketone polymer composition.

2. The composition of claim 1 wherein the ketone polymer has the repeating formula:

$$[CO(CH_2-CH_2)]_x [CO(G)]_y$$

wherein G is a moiety of an ethylenically unsaturated hydrocarbon of at least 3 carbon atoms, polymerized through the ethylenic unsaturation, and the ratio of y:x is no more than about 0.5.

3. The composition of claim 1 wherein the additive comprises about 0.01 weight % to about 10.0 weight % based on the weight of the additive and ketone polymer.

4. The composition of claim 3 wherein the ratio of aluminum hydroxide to the polyol compound is from 90/10 to 10/90.

5. The composition of claim 3 wherein the additive is present in an amount of about 0.05 to about 2.0 weight %.

6. The composition of claim 1 wherein the polyol is selected from the group of carbohydrates consisting of carbohydrates, reduced carbohydrates, oxidized carbohydrates, sugar alcohol and mixtures thereof.

7. The composition of claim 6 wherein the polyol is a carbohydrate.

8. The composition of claim 6 wherein the carbohydrate is a reduced carbohydrate.

9. The composition of claim 8 wherein the reduced carbohydrate is selected from the group consisting of sorbitol and xylitol having the formula:

$$HOCH_2(CHOH)_n CH_2OH$$

wherein n is an integer of 3 to 4.

10. The composition of claim 1 wherein the aluminum hydroxide compound is selected from the group consisting of aluminum trihydroxides and aluminum oxide hydroxides.

11. The composition of claim 10 wherein the aluminum hydroxide compound is an aluminum oxide hydroxide.

12. The composition of claim 10 wherein the aluminum oxide hydroxide is boehmite.

13. The composition of claim 10 wherein the aluminum oxide hydroxide is pseudo-boehmite.

14. The composition of claim 1 comprising in addition to the alphatic ketone and additive stabilizer, other additives selected from the group consisting of a secondary stabilizers, impact modifiers, flame retardants, reinforcing fillers, anti-oxidants, other polymers and mixtures thereof.

* * * * *